Figure 1:
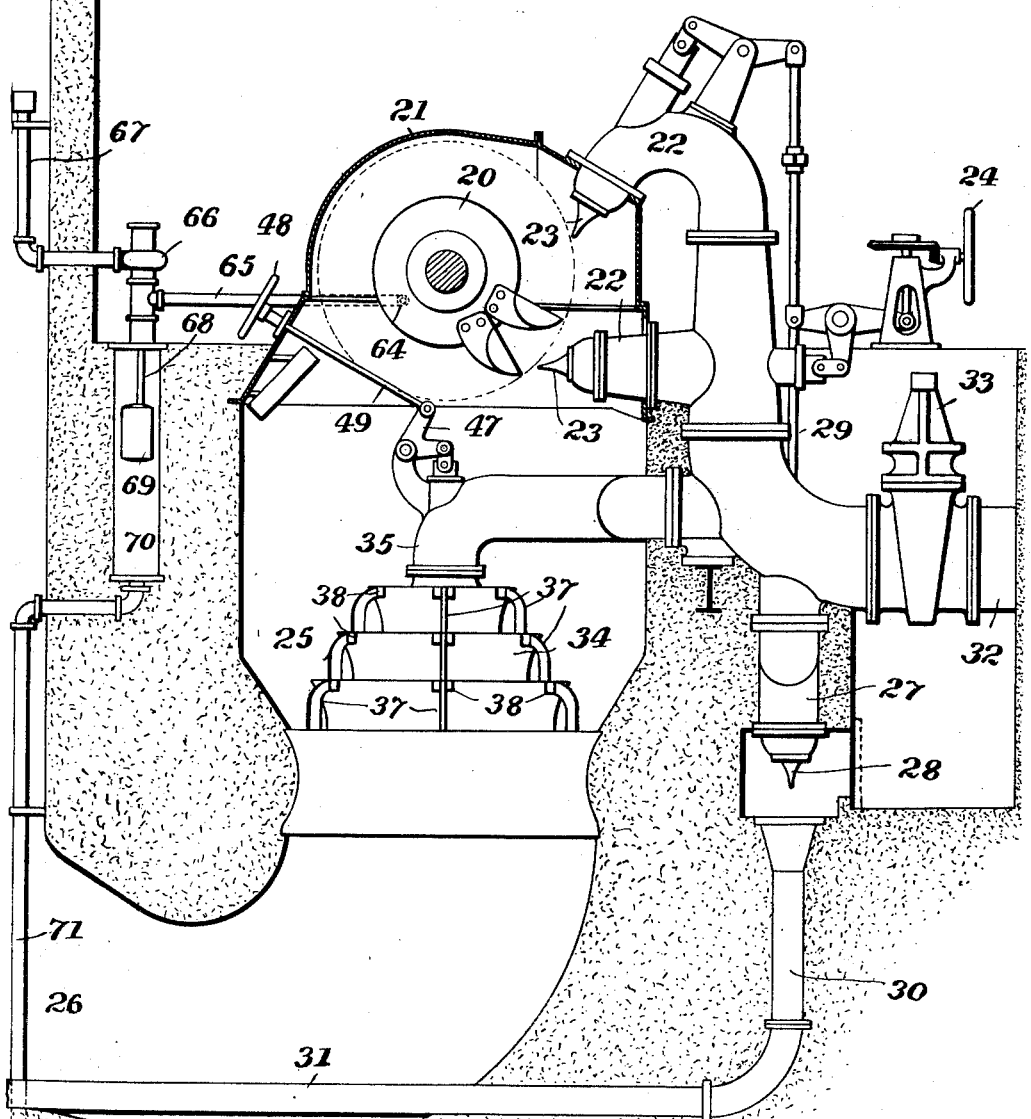

W. A. DOBLE.
MEANS FOR CONTROLLING THE DISCHARGE FROM HYDRAULIC MOTORS.
APPLICATION FILED MAY 24, 1910.

1,025,611.

Patented May 7, 1912.

8 SHEETS—SHEET 1.

Witnesses
JGHinkel
JHBruninga

Inventor
William A. Doble
By
Forter, Freeman, Watson & Coit
Attorneys

W. A. DOBLE.
MEANS FOR CONTROLLING THE DISCHARGE FROM HYDRAULIC MOTORS.
APPLICATION FILED MAY 24, 1910.
1,025,611.
Patented May 7, 1912.
8 SHEETS—SHEET 2.
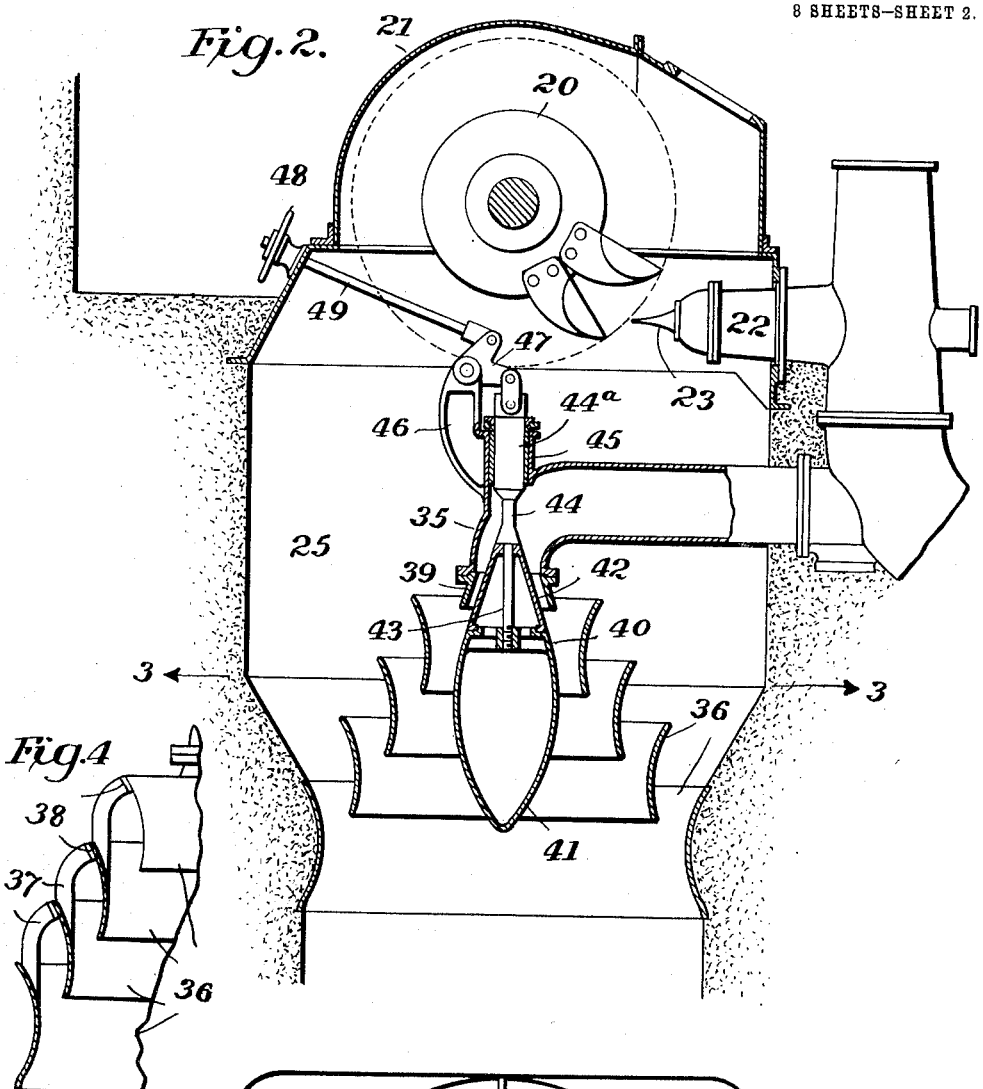
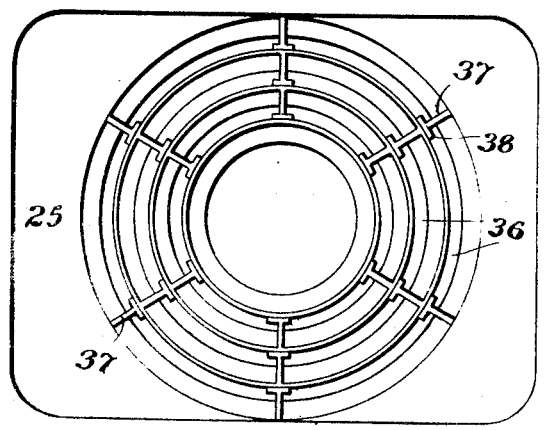

W. A. DOBLE.
MEANS FOR CONTROLLING THE DISCHARGE FROM HYDRAULIC MOTORS.
APPLICATION FILED MAY 24, 1910.
1,025,611.
Patented May 7, 1912.
8 SHEETS—SHEET 3.
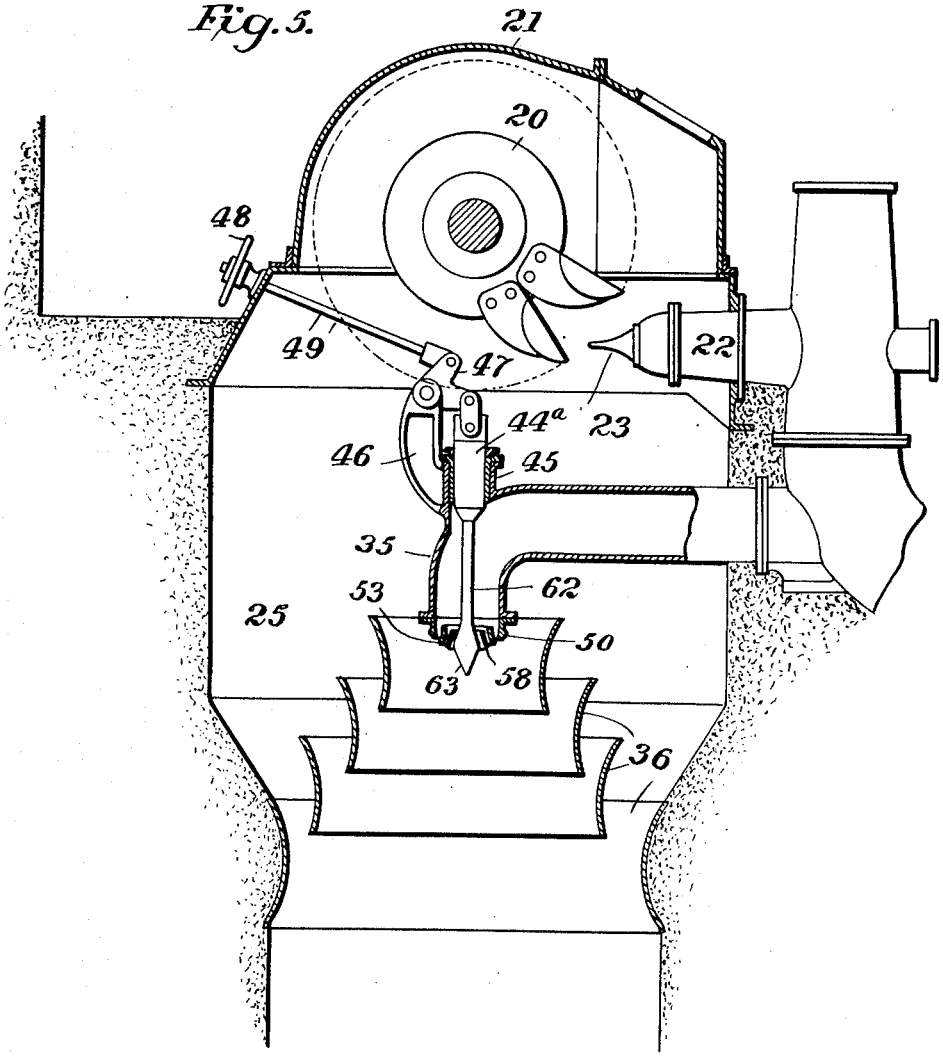

W. A. DOBLE.
MEANS FOR CONTROLLING THE DISCHARGE FROM HYDRAULIC MOTORS.
APPLICATION FILED MAY 24, 1910.
1,025,611.
Patented May 7, 1912.
8 SHEETS—SHEET 4.
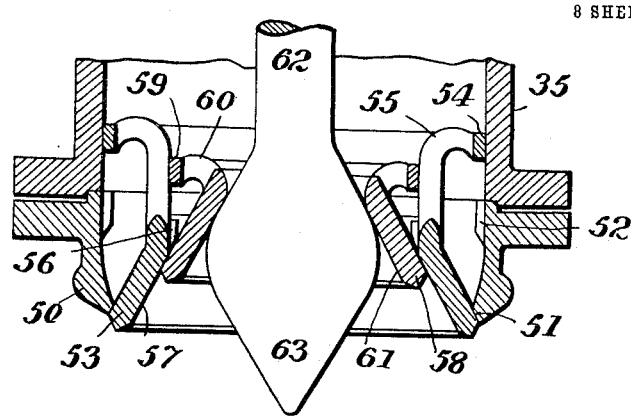
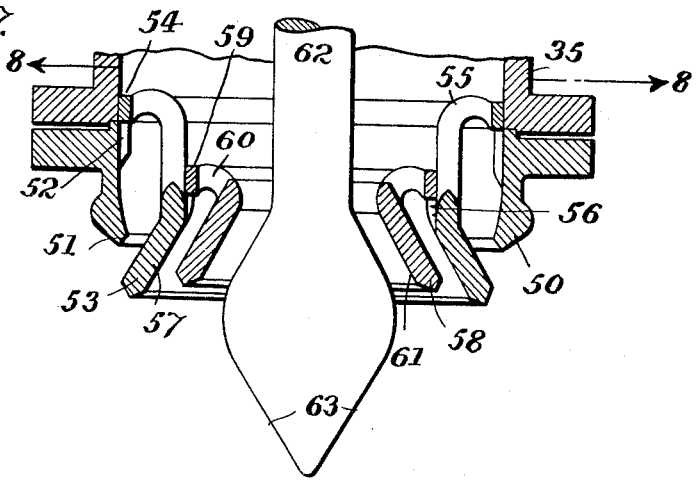
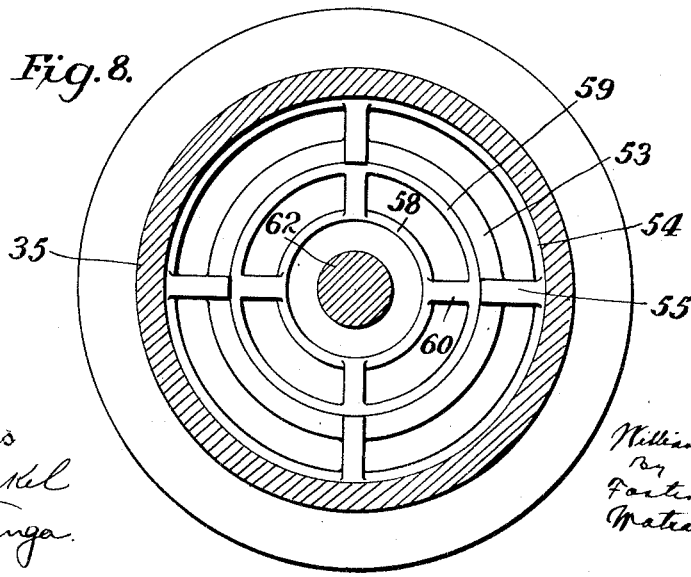

W. A. DOBLE.
MEANS FOR CONTROLLING THE DISCHARGE FROM HYDRAULIC MOTORS.
APPLICATION FILED MAY 24, 1910.
1,025,611.
Patented May 7, 1912.
8 SHEETS—SHEET 5.
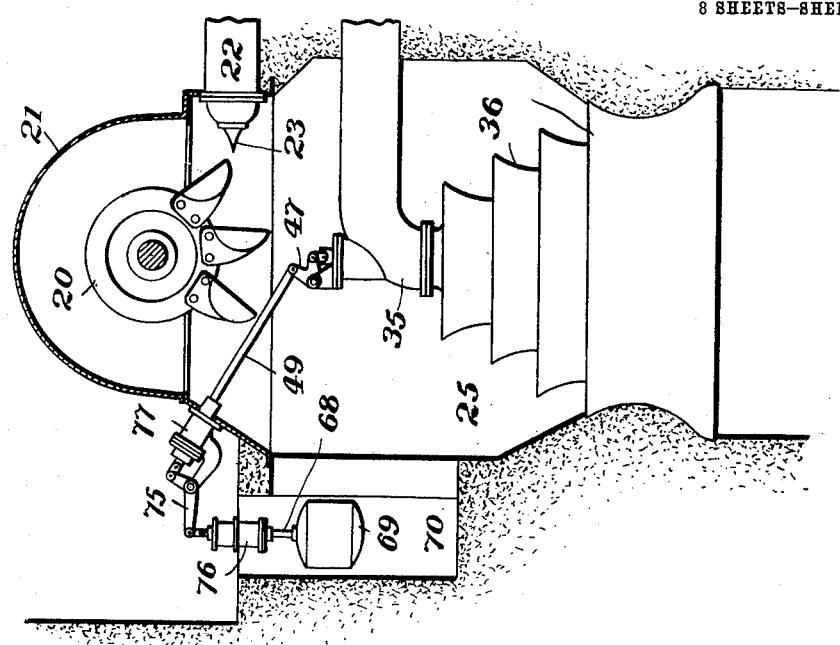
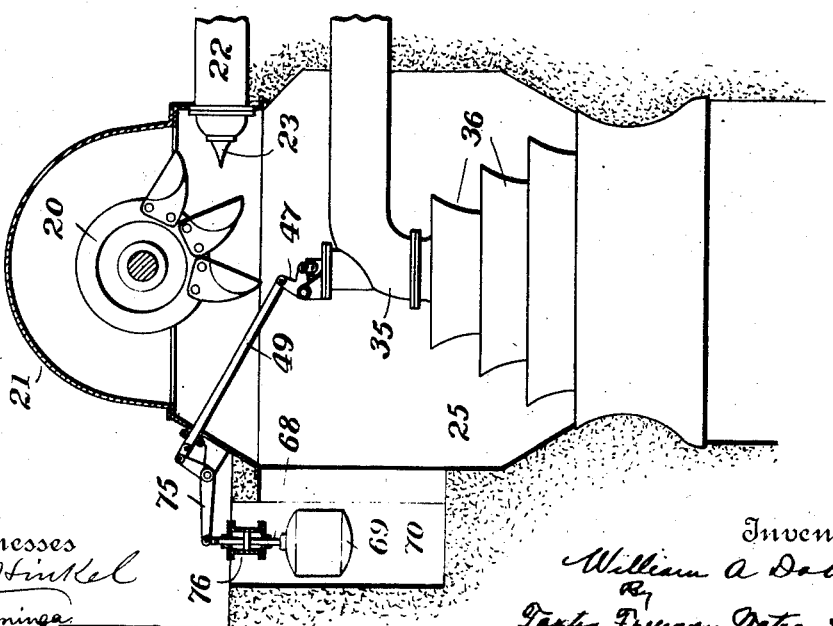

W. A. DOBLE.
MEANS FOR CONTROLLING THE DISCHARGE FROM HYDRAULIC MOTORS.
APPLICATION FILED MAY 24, 1910.
1,025,611.
Patented May 7, 1912.
8 SHEETS—SHEET 6.
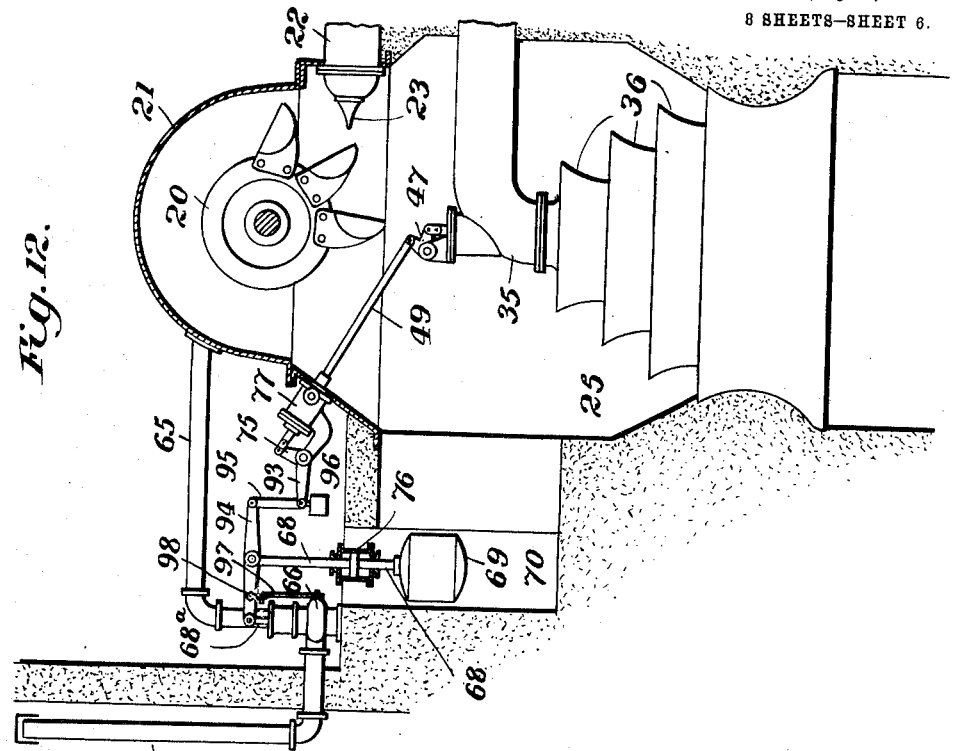
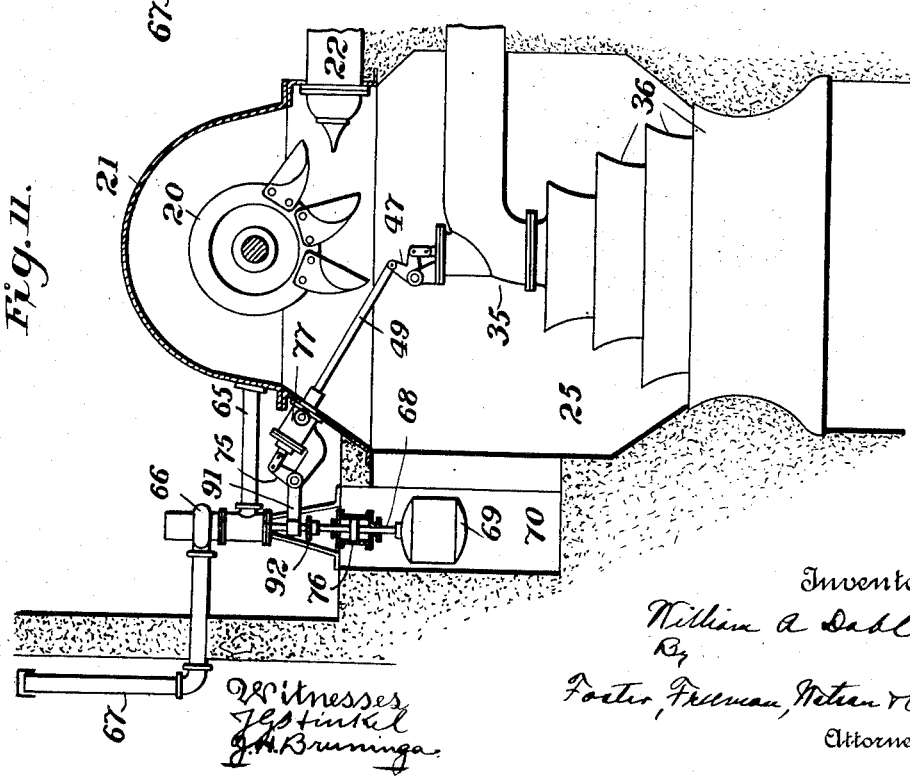
Inventor
William A. Doble
By
Foster, Freeman, Watson & Coit
Attorneys
Witnesses W. A. DOBLE.
MEANS FOR CONTROLLING THE DISCHARGE FROM HYDRAULIC MOTORS.
APPLICATION FILED MAY 24, 1910.

1,025,611.

Patented May 7, 1912.

8 SHEETS—SHEET 7.

Witnesses
J.G. Hinkel
J.H. Bruninga

Inventor
William A. Doble
By
Foster, Freeman, Watson & Cox
Attorneys

W. A. DOBLE.
MEANS FOR CONTROLLING THE DISCHARGE FROM HYDRAULIC MOTORS.
APPLICATION FILED MAY 24, 1910.

1,025,611.

Patented May 7, 1912.
8 SHEETS—SHEET 8.

UNITED STATES PATENT OFFICE.

WILLIAM A. DOBLE, OF SAN FRANCISCO, CALIFORNIA, ASSIGNOR TO MAY E. DOBLE, OF SAN FRANCISCO, CALIFORNIA.

MEANS FOR CONTROLLING THE DISCHARGE FROM HYDRAULIC MOTORS.

1,025,611.   Specification of Letters Patent.   Patented May 7, 1912.

Application filed May 24, 1910. Serial No. 563,140.

*To all whom it may concern:*

Be it known that I, WILLIAM A. DOBLE, a citizen of the United States, and resident of San Francisco, county of San Francisco, State of California, have invented certain new and useful Improvements in Means for Controlling the Discharge from Hydraulic Motors, of which the following is a specification.

This invention relates to hydraulic motors, and particularly to mechanism for controlling the discharge of water from the motor.

In the operation of hydraulic motors, it often happens that the water will back up in the tailrace and draft tube so as to interfere with the operation of the motor. This is especially true in times of flood. In order to overcome this, the practice heretofore has been to locate the motor high enough so that the draft tube effect will be great enough to prevent this interference. This obviously however prevents the available head from being fully utilized at all times.

One of the objects of this invention is to provide means whereby the discharged water can be controlled so that interference of the back water with the motor is prevented, thus allowing the available head to be fully utilized at all times.

Another object of this invention is to provide means whereby the vacuum of the motor may be regulated.

Further objects will appear from the detail description.

The invention will be described in connection with the accompanying drawings, in which—

Figure 14:
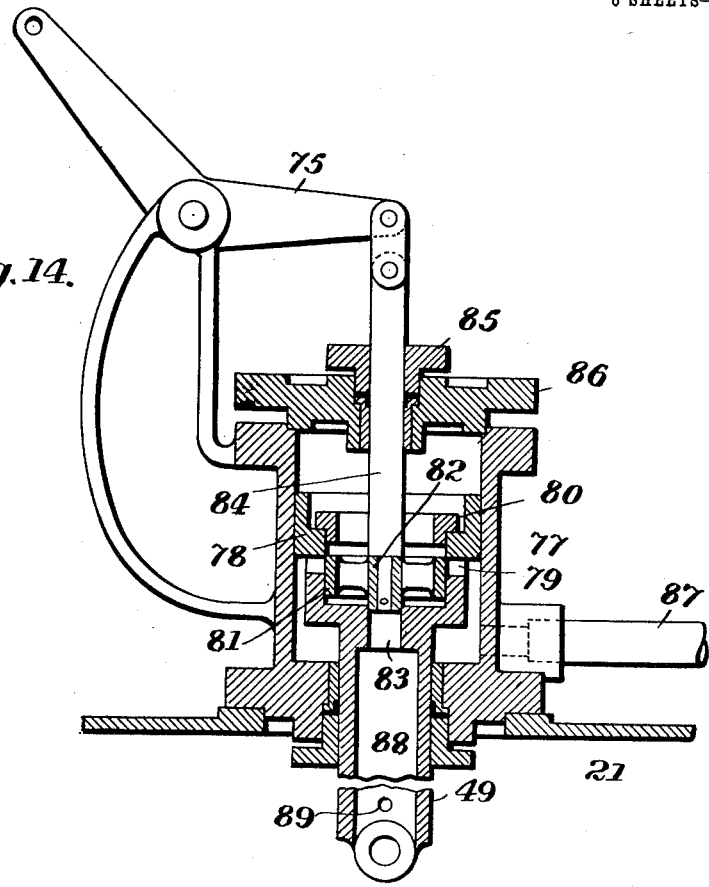
Figure 15:
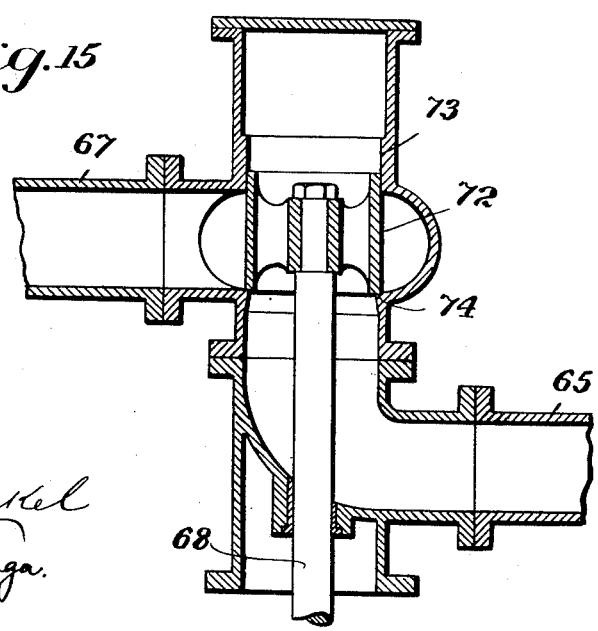

Figure 1 is a section through a power unit; Fig. 2 is an enlarged section showing the regulating device for the motor; Fig. 3 is a section on the line 3—3, Fig. 2. the nozzle for the regulating device being omitted and the regulating device being itself shown in elevation; Fig. 4 is a detail sectional view; Fig. 5 is a section showing another form of regulating device; Figs. 6 and 7 are detail sectional views showing the nozzle for the regulating device of Fig. 5; Fig. 8 is a section on the line 8—8, Fig. 7; Figs. 9 to 13 inclusive are sectional views showing different forms of this invention; Fig. 14 is a section through a servo motor; and Fig. 15 is a section through a regulating valve for the air inlet of the motor casing.

Referring to the drawings and more particularly to Figs. 1 to 4 inclusive, 20 designates a rotor of a hydraulic motor, the motor in this case being of the impact type although the invention is not necessarily limited to this particular type. The motor is provided with an inclosing casing 21. A number of nozzles 22 are provided for directing jets of water against the rotor, and these nozzles are controlled by needle valves 23, which are regulated through suitable levers and links from a hand wheel 24 or a governor, or both. The water from the wheel is discharged into a draft tube 25, and into a tailrace 26. A supplemental nozzle 27 is controlled by a needle valve 28, which is interconnected with the valves 23, by means of link connections 29. The nozzle 27 is arranged vertically as shown, and discharges into a conduit 30, which has connected to it a pipe 31 which discharges into the tailrace 26. The main and supplemental nozzles are connected to a main supply pipe 32, which is controlled by a suitable gate valve 33. The main and supplemental nozzles as to details may be of the construction shown in my prior Patent No. 941,440, in which the function of the supplemental nozzle has been fully described.

A regulating device 34 is located in the draft tube, and is provided with a nozzle 35 which is connected with the main and supplemental nozzles to the main supply pipe 32. The regulating device is shown in detail in Figs. 2, 3 and 4. It comprises a series of annular rings 36, which are curved in cross section, and nested together so as to form a vertical cone which tapers from the top toward the bottom. Each of the rings with exception of the upper one, is provided with a series of ribs 37, provided with feet 38 which engage the ring located above it. These ribs form spacing members to space and support the rings in position, as shown in Fig. 4. The rings are curved as shown, and the diameter at the lower end is smaller than the diameter at the upper end as shown in Fig. 4, so that the rings may easily be placed in position. By means of the above construction, the rings can be easily assembled. These rings are preferably cast and have the ribs 37 cast integral therewith, so that each ring rests upon the ribs formed on the one located beneath it. It is not absolutely necessary that a fastening means be provided to secure the rings in position, since the construction is such that the rings will be firmly held in place, but for further security fastenings, may be passed through the feet 38 and into the rings.

The nozzle 35 is provided with a discharge end 39 which is preferably conical as shown, and this discharge end is controlled by a conical valve or core piece 40, composed of sections 41 and 42 bolted together by a bolt 43. The stem 44 is provided with an enlarged shank 44$^a$ which passes through the stuffing box 45. By means of this construction, the valve may be partially or wholly balanced by the enlarged shank. The nozzle body is provided with a bracket 46 in which is pivotally mounted a bell crank lever 47 connected to the shank 44$^a$ by means of a link, and to a hand wheel 48 by means of a threaded link 49. The hand wheel is located outside of the casing as shown, so that the valve and the discharge from the nozzle may be closely regulated.

The nozzle 35 will direct an annular conical sheet or stream of water against the inside surface of the rings and this water will flow downwardly into the tailrace. The action of the stream is, first to forcibly carry the water discharged from the wheel through the draft tube and into the tailrace so as to force the water out of the tailrace and thus prevent backing up of the back water; and second, this stream of water in flowing past the inside surface of the cones will cause a vacuum to be created in the draft tube and the motor casing so as to facilitate the discharge of the water, and enable the wheel to run with high efficiency. It is of course well known to those skilled in the art, that it is advantageous to maintain a vacuum in the motor casing. By means of the above construction, the backing up of the water during flood periods will be prevented so that the available head can at all times be a maximum. The stream of water from the nozzle 35 will accelerate the water flowing through the draft tube, so that the body of water will be set in motion and discharge into the tailrace, even though the water in the tailrace may be higher than the motor. By means of the hand wheel 49 the height of the water in the draft tube and the vacuum in the motor casing can be closely controlled.

The valve or core piece 40 is so constructed as to direct the water against the inside surfaces of the rings, so as to obtain the most efficient results. The rings are so constructed and positioned that the sum of the areas of the spaces between the rings is equal to the area of the opening of the draft tube so that the velocity through the whole system or passageway may be the same in case the nozzle 35 is closed and gravity alone relied upon to carry off the water. Such will be the case when the water does not back up objectionably high in the motor casing.

In Figs. 5 to 8 inclusive, is shown a modified form in which a multiple jet nozzle is used to direct the water against the inside surface of the rings. The form of the nozzle shown is not herein specifically claimed, it being made the subject of another application No. 563,141, filed May 24, 1910. The nozzle 35 is provided with a discharge end 50 which has a conical shaped face 51. A series of axially movable rings or annular members 53 and 58 are located in the discharge end, ring 53 being connected to a ring 54 by means of a series of ribs 55 and the ring 54 engages with a series of stops 52 on the discharge end of the nozzle body. A second annular member 58 is connected to a ring 59 by means of a series of ribs 60 which engage a series of stops 56 on the annular member 53. A core piece 62 provided with an enlarged head 63 is located centrally of the nozzle. The annular members 53 and 58 are conical in form as shown, and provided with faces 57 and 61 respectively. In Fig. 6, the nozzle is shown in closed position, the core piece being drawn up so that the rings are moved upwardly to entirely close the ports of the nozzle. If now, the core piece 62 is operated so as to move downwardly, the port between the end 50 and the annular member 53 will be opened so as to discharge an annular stream of water against the rings 36. But the ports between the annular members 53, 58 and the core piece 63 remain closed, but as the core piece moves downwardly the ring 54 will be stopped by the stops 52, so that on further downward movement of the core piece, the port between the annular members 53 and 58 is opened. It will thus be seen that by moving the core piece downwardly the other ports will be successively thrown into operation. Similarly when the nozzle is closed by moving the core piece upwardly the ports are successively closed in inverse order. By means of this construction, it is found that the discharge of water can be more effectively controlled especially where the pressure is high.

The motor casing is preferably provided with an air inlet 64 connected by pipe 65 to an air valve 66, this air valve 66 having an outlet to the atmosphere by means of a pipe 67. The valve stem 68 is controlled by a float 69 located in a float chamber 70, which is connected to a pipe 71, extending into the tailrace. The valve is shown in detail in Fig. 15, and comprises a cylinder provided with a piston 72 working on a valve seat 73, and against a stop 74.

As the vacuum in the motor casing and the draft tube increases, that is as the pressure of the air drops, and as the height of the water in the tailrace rises, the water will also rise in the draft tube, and interference with the motor will result, provided the regulating device 34 is not provided. As the height of the water in the tailrace increases the water will also rise in the pipe 71 and the float chamber 70, causing the float 69 to rise and the valve 72 to open so as to connect the pipe 65 to the air inlet 64 with the outside air, thus increasing the pressure inside of the motor casing, and causing the height of the water in the draft tube to drop. The stop 74 is provided so as to limit the lowest movement of the valve and the float. It will be understood that this vacuum controlling device may be uesd independently of the regulating device 34.

There is a great advantage in extending the pipe 71 into the tailrace so as to regulate the vacuum by the true height of the water in the tailrace. The water in the draft tube will be in a very agitated condition, and therefore if the float chamber 70 were connected with the draft tube directly the true height of the water in the draft tube would not be indicated in the float chamber, due to the agitated condition. But by connecting the float chamber with a portion of the discharge conduit where the water is comparatively quiet as in the tailrace, the parts can be so constructed that the true height of the water in the draft tube will always be correctly indicated.

In Figs. 9 to 12 inclusive, various arrangements have been shown. In this case, the float chamber 70 is for simplicity's sake connected directly to the draft tube but it will be understood that in ordinary operation it is preferable to connect the float chamber with the tailrace as shown in Fig. 1.

In Fig. 9, the nozzle 35 is controlled automatically by the height of the water in the draft tube. For this purpose, the link 49 which is operatively connected with the valve 40 is connected to a bell crank lever 75 which is connected by a suitable link to the stem 68 of the float 69. In this construction, if the water in the draft tube rises above a predetermined level, the float 69 will be operated to open the nozzle 35 so as to force the water through the draft tube and prevent backing up of the water as previously described. It will thus be seen that means are provided for automatically controlling the height of the water in the draft tube and that this means is brought into operation by the height of the water in the draft tube. As previously pointed out, the water in the draft tube will be in an agitated condition but this may be compensated for in the construction shown in Fig. 9, by providing a suitable dash pot 76, which will dampen the vibration. It will be understood that this dash pot may also be provided for the stem of the float 69 in Fig. 1.

In Fig. 10, the nozzle valve 40 is operated by means of a servo motor 77. This servo motor is shown in detail in Fig. 14. This motor comprises a cylinder in which works a piston 78 provided with ports 79. The piston 78 is bored to form a cylinder for a valve piston 81, and is further provided with a stop or head 80. The valve piston 81 is provided with a cylindrical extension which fits a hole or port 83 bored in the link or rod 49, the rod 49 working in a stuffing box as shown. The piston valve 81 is provided with a valve rod 84 which extends through a stuffing box 85 in the head 86, and is connected by a link to the bell crank lever 75. The water is supplied to the motor by means of a pipe 87, and the rod 49 is bored as shown, at 88, and provided with discharge opening 89.

The operation is as follows: The bell crank lever 75 being operatively connected to the float 69 if the level of the water in the draft tube rises above a predetermined level, the float will be raised so as to move the piston valve 81 downward, Fig. 14. This will open the ports 79 to the pipe 87, so as to allow the water to flow in the rearward part of the cylinder. Since the area of the rear face of the piston 78 is greater than the front face, the piston 78 will be moved downward so as to open the valve 40. The piston 78 will keep on moving until the ports 79 are moved past the piston valve 81, so that the supply of water will be automatically cut off after the piston 78 and the valve 40 have been moved a predetermined amount. If, now the level of the water in the draft tube drops, the float 69 will drop so as to move the piston valve 81 upward causing the cylindrical extension to move out of the port 83, so as to open the port 83 and the interior of the rod 49 to the rear end of the piston causing the pressure on that side to be relieved and causing the piston 78 to be moved upward so as to again close the valve 40. In this case, also as soon as the piston is moved a predetermined amount upward the port 83 will be automatically closed. The water is discharged into the draft tube through the hole 89. It will thus be seen that this construction enables the height of the water in the draft tube to be automatically controlled.

In Fig. 11 the float 69 is arranged and connected so as to automatically control both the vacuum in the motor casing and the nozzle 35. The stem 68 connected to the float extends into the casing of the air valve 66 and is connected to the piston valve 72, in a similar manner as shown in Fig. 15. The arm 91 of the bell crank lever 75 is forked so as to embrace the stem and this stem has mounted upon it a tappet 92 which is vertically adjustable thereon. There is thus a lost motion connection between the stem 68 and the bell crank lever 75.

In operation, if the water in the draft tube rises above a predetermined level, the float operates to open the valve 72 so as to connect the motor casing pipe 65 with the atmosphere. The pressure in the motor casing is thus increased. If however, this increase of pressure is insufficient and the water still rises, then the tappet 92 will engage the arm 91 of the bell crank lever 75 so as to set the servo motor 77 in operation to open the nozzle 35. The servo motor may be thrown out of operation by moving the tappet 92 down on the stem 68 so that it will not strike the bell crank lever 91. This may be convenient where the servo motor is out of repair.

In the construction shown in Fig. 12, the stem 68 is mounted upon a two armed lever 94, which is connected to the arm 93 of the bell crank lever 75 by a link 95. The outer end of the arm 93 has mounted upon it a weight 96. The other end of the lever 94 is connected to the stem 68ª of the valve 72, the stem extending through the stuffing box in the upper end of the valve casing 66. The lever 94 has mounted upon it a ring 98 which is arranged to be engaged by a hook 97, pivotally connected to the valve casing 66. If the hook 97 is disengaged so as to leave the left hand arm of the lever 94 free and the water in the draft tube rises to a predetermined level, the float 69 will be raised. Due to the fact that the right hand end of the lever is weighted by means of the weight 96, the lever will swing on its right hand pivotal connection and the link 95 as an axis, so as to cause the valve piston 72 to open communication between the motor casing pipe 65 and the atmosphere. If this is insufficient to reduce the level of the water in the draft tube, the float will continue to rise until the valve 72 is stopped by the head of the casing 66. A further movement of the float 69 will now cause the lever 94 to swing about its left hand pivotal connection to the stem 68ª as an axis so as to operate the servo motor so as to open the nozzle 35. The air valve may be thrown out of operation by throwing the hook 97 into engagement with the ring 98. This will lock the valve 72 in its lowest and closed position.

In both of the constructions shown in Figs. 11 and 12, the stem 68 may be provided with a dash pot and further the servo motor 77 may be dispensed with and a direct connection made between the bell crank lever 75 and the rod 49 as in the construction shown in Fig. 9. Furthermore a dash pot connection may be made between the bell crank lever 75 and the rod 49 in which case, the dash pot will take the place of the servo motor 77. In both constructions, the successive operations of the air valve and the nozzle 35 is accomplished by a lost motion connection between the operating mechanism and one of said controlling mechanisms.

Figure 13:
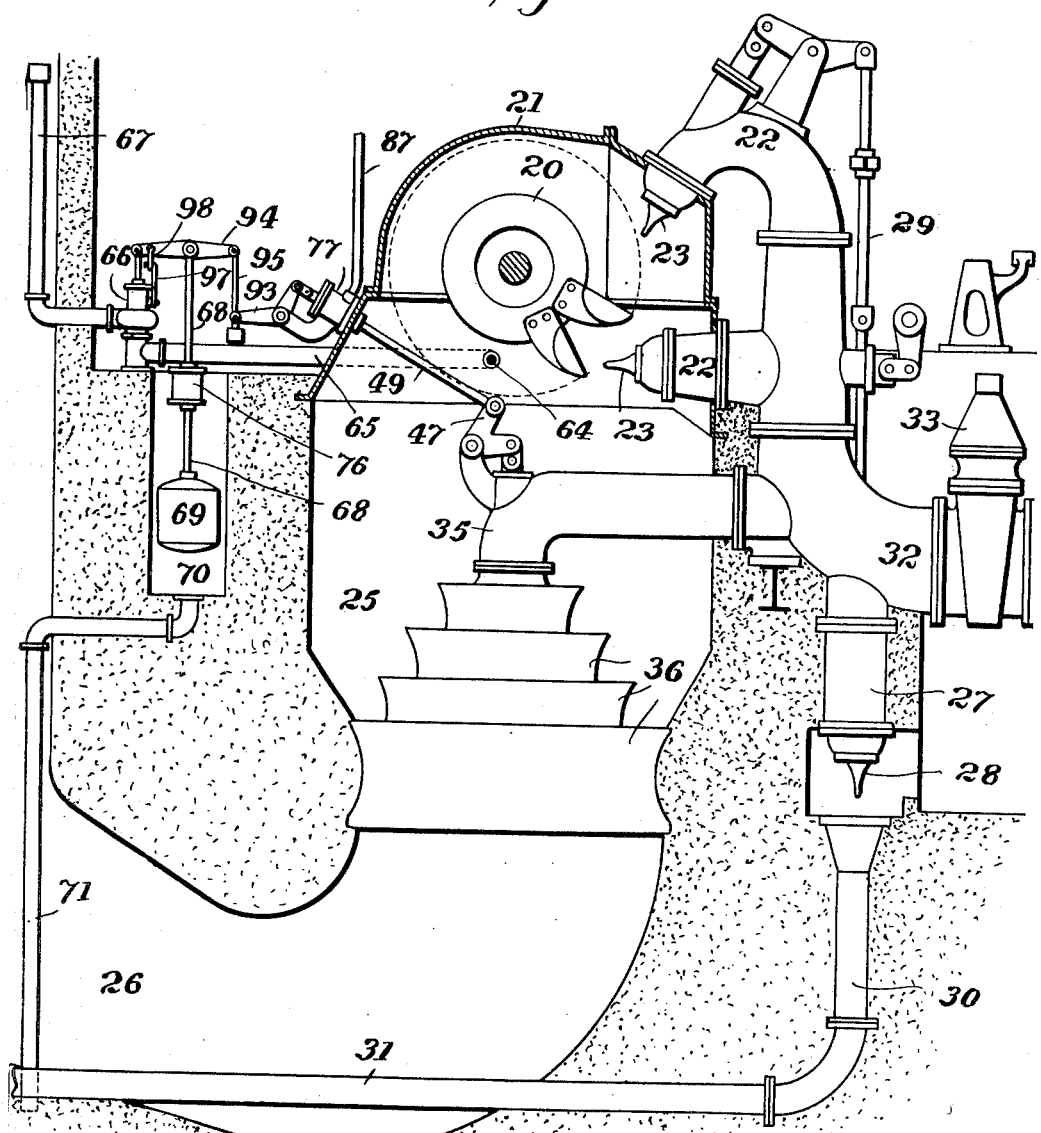

In Fig. 13, the float chamber 70 is shown as connected to the tailrace as in Fig. 1. It will be understood that in both cases, a suitable strainer will be located at the lower part of pipe 71. The construction of the controlling mechanisms is otherwise substantially the same as shown in Fig. 12.

It is obvious that various changes may be made in the details of construction without departing from this invention, and it is, therefore, to be understood that this invention is not to be limited to the specific construction shown and described.

Having thus described the invention, what is claimed is:

1. The combination with a hydraulic motor and a conduit for conducting the water discharged from said motor, of a cone-shaped device having inlet openings in its walls in communication with said conduit, and means for directing a stream of water against the walls of said device.

2. The combination with a hydraulic motor and a conduit for conducting the water discharged from said motor, of a cone-shaped device having inlet openings in its walls in communication with said conduit, and means for directing an annular stream of water against the inside walls of said device.

3. The combination with a hydraulic motor and a conduit for conducting the water discharged from said motor, of a device in communication with said motor and comprising a series of annular rings, and means for directing a stream of water against the walls of said rings.

4. The combination with a hydraulic motor and a conduit for conducting the water discharged from said motor, of a device in communication with said motor and comprising a series of annular rings positioned to form a cone, and means for directing a stream of water against the walls of said rings.

5. The combination with a hydraulic motor and a draft tube therefor, of a cone-shaped device located in said draft tube and having inlet openings in its walls, and means for directing a stream of water against the inside walls of said device.

6. The combination with a hydraulic motor and a draft tube therefor, of a device located in said draft tube and comprising a series of annular rings, and means for directing a stream of water against the walls of said rings.

7. The combination with a hydraulic motor and a draft tube therefor, of a device having walls and inlet openings therein in communication with said motor, means for directing a stream of water against said walls, and a valve for throttling said stream.

8. The combination with a hydraulic motor and a draft tube therefor, of a cone-shaped device having inlet openings in its walls in communication with said motor, means for directing a conical sheet of water against the walls of said device, and a cone-shaped valve for controlling said stream.

9. The combination with a hydraulic motor and a draft tube therefor, of a device in communication with said motor comprising a series of rings positioned to form a cone, and a nozzle located near the apex of said cone to direct a conical sheet of water against said rings.

10. The combination with a hydraulic motor and a draft tube therefor, of a device in communication with said motor comprising a series of rings positioned to form a cone, a nozzle located near the apex of said cone to direct a conical sheet of water against said rings, and a conical valve for said nozzle.

11. The combination with a hydraulic motor and a draft tube therefor, of a device in communication with said motor and comprising a series of rings curved in section, and means for directing a stream of water against the walls of said rings.

12. The combination with a hydraulic motor and a draft tube therefor, of a device in communication with said motor and comprising a series of rings, spacing members for said rings, and means for directing a stream of water against the walls of said rings.

13. The combination with a hydraulic motor and a draft tube therefor, of a device in communication with said motor and comprising a series of rings, ribs on one of said rings arranged to support and space the adjacent ring in nested relation therewith.

14. The combination with a hydraulic motor and a draft tube therefor, of a regulating device comprising a series of rings positioned to form a cone, a discharge nozzle near the apex of the cone and a bulb-shaped valve for said nozzle.

15. The combination with a hydraulic motor and a draft tube therefor, of a regulating device connected to said motor and having walls, a multiple nozzle arranged to discharge a stream of water against the walls of said device, and means for bringing the elements of said nozzle into operation.

16. The combination with a hydraulic motor and a draft tube therefor, of a regulating device connected to said motor and having walls, a multiple nozzle having a plurality of ports arranged to discharge annular streams of water against said walls, and means for bringing said ports into operation.

17. The combination with a hydraulic motor and a draft tube therefor, of a cone-shaped regulating device connected to said motor, a multiple nozzle having a plurality of ports arranged to discharge annular streams of water against said walls, and means for bringing said ports into operation.

18. The combination with a hydraulic motor and a draft tube therefor, of a regulating device connected to said motor comprising a plurality of annular rings, and a multiple nozzle arranged to discharge a plurality of concentric annular streams of water against said rings.

19. In a hydraulic motor having a draft tube and tailrace, the combination with a main supply pipe, of main and supplemental nozzles connected thereto, a regulating device in the draft tube, a nozzle for said device connected to said supply pipe, and a conduit into which the supplemental nozzle discharges and leading to the tailrace.

20. The combination with a hydraulic motor and a conduit for the water discharged from said motor, of means governed by the height of the water in said conduit for automatically forcing water out of said conduit and controlling the height of the water in said conduit.

21. The combination with a hydraulic motor and a conduit for the water discharged from said motor, of means for automatically controlling the height of the water in said conduit by forcing the water therefrom, and governing means for said controlling means including a pipe extending into a part of said conduit where the water is comparatively quiet.

22. The combination with a hydraulic motor, a draft tube and a tailrace therefor, of means including a member extending into the tailrace for automatically controlling the height of the water in the draft tube by forcing the water therefrom.

23. The combination with a hydraulic motor, a draft tube and a tailrace therefor, of means for automatically controlling the height of the water in the draft tube by forcing the water therefrom, and governing means for said controlling means including a pipe extending into the tailrace.

24. The combination with a hydraulic motor, a draft tube and a tailrace therefor, of means for automatically controlling the height of the water in the draft tube by forcing the water therefrom including a float, a float chamber for said float, and a pipe extending from said float chamber into the tailrace.

25. The combination with a hydraulic motor and a conduit for the water discharged from said motor, of a regulating device connected with said conduit, a nozzle for said device, and means governed by the height of the water in said conduit for controlling said nozzle.

26. The combination with a hydraulic motor and a conduit for the water discharged from said motor, of a regulating device connected with said conduit, a nozzle for said device, and means governed by the vacuum in the motor for controlling said nozzle.

27. The combination with a hydraulic motor and a conduit for the water discharged from said motor, of a regulating device connected with said conduit, a nozzle for said device, means including a float for controlling said nozzle, a float chamber, and a pipe connecting said chamber with said conduit.

28. The combination with a hydraulic motor, a draft tube and a tailrace therefor, of a regulating device connected to said draft tube, a nozzle for said device, and means for controlling said nozzle including a member extending into the tailrace.

29. The combination with a hydraulic motor, a draft tube and a tailrace therefor, of a regulating device connected to said draft tube, a nozzle for said device, means including a float for controlling said nozzle, a float chamber, and a pipe connected to said float chamber and extending into the tailrace.

30. The combination with a hydraulic motor and a conduit for the water discharged from said motor, of a regulating device connected with said conduit, a nozzle for said device, means including a float governed by the water in the conduit for controlling said nozzle, and a dash pot for said float.

31. The combination with a hydraulic motor and a conduit for the water discharged from said motor, of a regulating device connected with said conduit, a nozzle and valve for said device, and a motor for operating said valve.

32. The combination with a hydraulic motor and a conduit for the water discharged from said motor, of a regulating device connected with said conduit, a nozzle and valve for said device, a motor for operating said valve, and automatic controlling means for said motor.

33. The combination with a hydraulic motor and a conduit for the water discharged from said motor, of a regulating device connected with said conduit, a nozzle and valve for said device, a motor for operating said valve, and means governed by the height of the water in said conduit for controlling said motor.

34. The combination with a hydraulic motor and a conduit for the water discharged from said motor, of a regulating device connected with said conduit, a nozzle and valve for said device, a motor for operating said valve, and means governed by the vacuum in the motor for controlling said motor.

35. The combination with a hydraulic motor, having a casing and a conduit for the water discharged from the motor, of a regulating device connected with said conduit, a nozzle for said device, an air inlet for said casing, and means for automatically controlling said nozzle and air inlet.

36. The combination with a hydraulic motor having a casing and a conduit for the water discharged from the motor, of a regulating device connected with said conduit, a nozzle for said device, an air inlet for said casing, regulating devices for said nozzle and air inlet, and means interconnecting said devices.

37. The combination with a hydraulic motor, having a casing and a conduit for the water discharged from the motor, of a regulating device connected with said conduit, a nozzle for said device, an air inlet for said casing, means for automatically controlling said nozzle and air inlet, and means for rendering one of the controlling means ineffective.

38. The combination with a hydraulic motor, having a casing and a conduit for the water discharged from the motor, of a regulating device connected with said conduit, a nozzle for said device, an air inlet for said casing, regulating devices for said nozzle and air inlet, means for automatically operating said devices, and means for rendering one of said devices ineffective.

39. The combination with a hydraulic motor, having a casing and a conduit for the water discharged from the motor, of a regulating device connected with said conduit, a nozzle for said device, an air inlet for said casing, and means controlled by the height of the water in said conduit for automatically controlling said nozzle and air inlet.

40. The combination with a hydraulic motor, having a casing and a conduit for the water discharged from the motor, of a regulating device connected with said conduit, a nozzle for said device, an air inlet for said casing, regulating devices for said nozzle and air inlet, and a lost motion connection between said devices.

41. The combination with a hydraulic motor having a casing and a conduit for the water discharged from the motor, of a regulating device connected with said conduit, a nozzle for said device, an air inlet for said casing, regulating devices for said nozzle and air inlet, means for automatically operating said devices, and a lost motion connection between said operating means and one of said devices.

42. The combination with a hydraulic motor having a casing and a conduit for the water discharged from the motor, of a regulating device connected with said conduit, a nozzle for said device, an air inlet for said casing, regulating devices for said nozzle and air inlet, and means for operating said devices in succession.

In testimony whereof I affix my signature in presence of two witnesses.

WILLIAM A. DOBLE.

Witnesses:
 FREDERICK GFELLER,
 LEOPOLD M. KARNASCH.